United States Patent [19]
Motose

[11] Patent Number: 5,234,363
[45] Date of Patent: Aug. 10, 1993

[54] BATTERY CHARGING DEVICE INSTALLING STRUCTURE FOR OUTBOARD MOTOR

[75] Inventor: Hitoshi Motose, Hamamatsu, Japan

[73] Assignee: Sanshin Kogyo Kabushiki Kaisha, Hamamatsu, Japan

[21] Appl. No.: 776,692

[22] Filed: Oct. 15, 1991

Related U.S. Application Data

[63] Continuation of Ser. No. 507,313, Apr. 10, 1990, abandoned.

[30] Foreign Application Priority Data

Apr. 10, 1989 [JP] Japan .................. 1-89940

[51] Int. Cl.⁵ .................................. B63H 21/36
[52] U.S. Cl. ........................ 440/77; 310/68 D; 440/900
[58] Field of Search ............... 440/77, 85; 123/599, 123/605; 310/64, 68 D; 361/383, 399

[56] References Cited

U.S. PATENT DOCUMENTS

| | | | |
|---|---|---|---|
| 3,217,696 | 11/1965 | Kiekhaefer | 440/900 |
| 3,542,007 | 11/1970 | Minks | 123/599 |
| 3,703,642 | 11/1972 | Balaguer | 440/76 |
| 3,895,247 | 7/1975 | Iwata et al. | 310/68 D |
| 4,054,113 | 10/1977 | Sleder et al. | 123/599 |
| 4,233,534 | 11/1980 | Tharman | 310/68 D |
| 4,325,350 | 4/1982 | Bauer et al. | 123/599 |
| 4,418,677 | 12/1983 | Hofmann | 123/605 |
| 4,583,953 | 4/1986 | Nakase | 440/52 |
| 4,632,662 | 12/1986 | Handa | 440/77 |
| 4,933,809 | 6/1990 | Boede et al. | 440/77 |

FOREIGN PATENT DOCUMENTS

| | | | |
|---|---|---|---|
| 35944 | 2/1985 | Japan | 310/64 |
| 64545 | 3/1988 | Japan | 310/68 D |
| 1085094 | 9/1967 | United Kingdom | 310/68 D |

Primary Examiner—Sherman Basinger
Assistant Examiner—Thomas J. Brahan
Attorney, Agent, or Firm—Ernest A. Beutler

[57] ABSTRACT

A battery charging device installing structure for an outboard motor wherein the outboard motor includes a power head having an internal combustion engine and a surrounding protective cowling. An alternator is driven by the engine and charges a remotely positioned battery through a rectifier that is mounted apart from the engine and on a highly heat conducting portion of the heat protective cowling for cooling of the rectifier.

3 Claims, 2 Drawing Sheets

BATTERY CHARGING DEVICE INSTALLING STRUCTURE FOR OUTBOARD MOTOR

This is a continuation of U.S. patent application Ser. No. 507,313, filed Apr. 10, 1990, now abandoned.

BACKGROUND OF THE INVENTION

This invention relates to a battery charging device installing structure for an outboard motor and more particularly to an improved mounting and cooling arrangement for the rectifier of an outboard motor battery charging system.

It is well known with outboard motors, particularly those of the large displacement type, to employ a separate battery which battery is charged by an alternator which may form a portion of the magneto ignition system for the engine. Because of the alternating input current from the charging device, it is necessary to employ a rectifier for converting the alternating current into direct current to charge the battery. Frequently, a voltage regulator is also employed in conjunction with the rectifier. When used herein in both the specification and claims, the term "rectifier" is used generically so as to cover a rectifier per se or a rectifier regulator.

Obviously, the rectifier becomes heated in its operation. As larger alternators are employed, the amount of heat generated by the rectifier increases significantly. It has been the practice to provide an arrangement for cooling the rectifier in outboard motor applications. This may be done by providing either cooling fins on the rectifier for air cooling or by placing the rectifier so that it will be in contact with the engine water cooling system and water cooled. However, both of these constructions have disadvantages.

As the power output becomes larger, the dimension of the cooling fins also becomes larger. Quite obviously there is not adequate space in conventional outboard motors to accommodate such large finned rectifiers. In addition, the increase in the amount of finning can in some events actually interfere with the amount of cooling.

Where the rectifier is water cooled, on the other hand, obvious corrosion problems can exist, particularly when operating in marine environments. As corrosion builds up on the rectifier outer surfaces, the heat transmission ability becomes reduced and overheating and eventual destruction of the rectifier can be a problem.

It is, therefore, a principal object of this invention to provide an improved rectifier and mounting arrangement for an outboard motor wherein the rectifier will be cooled but no special cooling construction of the rectifier per se or involvement with the engine cooling system is required.

It is a further object of this invention to provide an improved, simplified and highly effective arrangement for cooling a rectifier in an outboard motor battery charging system.

SUMMARY OF THE INVENTION

This invention is adapted to be embodied in a battery charging system for an outboard motor. The outboard motor includes a power head having an internal combustion engine and surrounding protective cowling. An alternator is driven by the engine and generates an alternating source of current. A rectifier is in circuit with the alternator and with a battery for charging the battery. In accordance with the invention, the rectifier is mounted within the power head but other than on the internal combustion engine and in heat exchanging relationship with a heat conducting material for cooling the rectifier.

DETAILED DESCRIPTION OF THE PREFERRED EMBODIMENTS OF THE INVENTION

Figure 1:
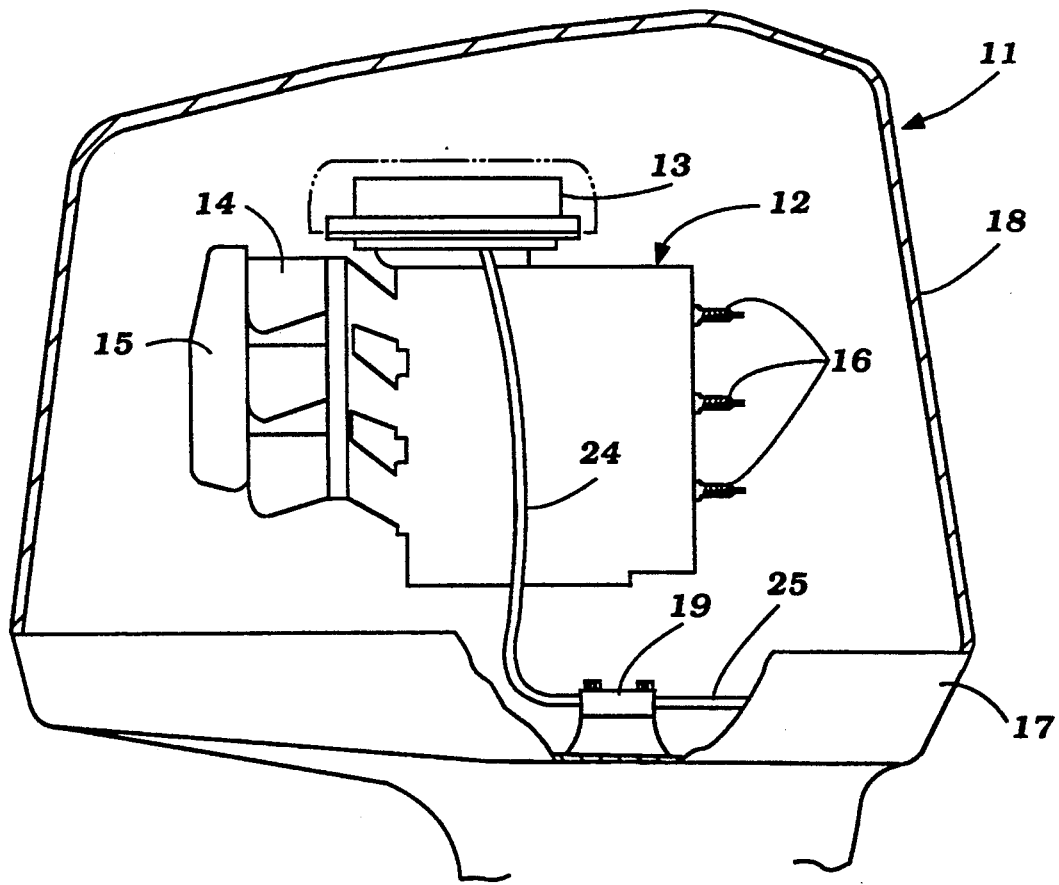
FIG. 1 is a partial side elevational view, with a portion broken away, of the power head of an outboard motor constructed in accordance with an embodiment of the invention.
Figure 2:
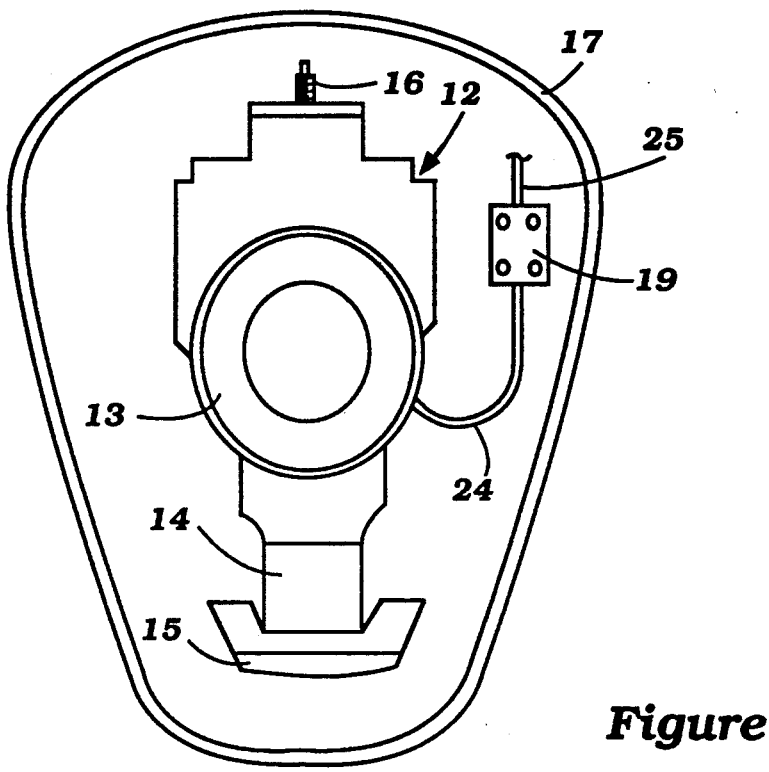
FIG. 2 is a top plan view of the power head with the protective cowling main portion removed to more clearly show the construction.
Figure 3:
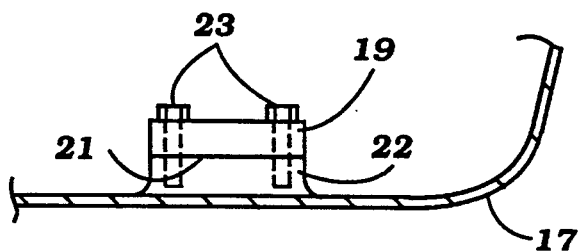
FIG. 3 is an enlarged side elevational view showing the mounting for the rectifier.

Referring first in detail to FIG. 1, an outboard motor is identified generally by the reference numeral 11. Since the invention relates to the charging system for a remotely positioned battery (not shown) which is conventionally positioned within the hull of the associated watercraft, only the power head of the outboard motor 11 is depicted and only the external construction of the components thereof need be illustrated and described.

The power head includes an internal combustion engine 12 which may be of any known type and which is depicted as being of the in line three cylinder type operating on a two stroke crankcase compression principle. As is conventional with outboard motor practice, the engine 12 is disposed so that its output shaft rotates about a vertically extending axis. A flywheel magneto 13 is connected to the upper end of the output shaft in a known manner.

The engine 12 is also provided with an induction system including a plurality of carburetors 14 that draw air from an air inlet device 15 and form a fuel/air mixture which is delivered to the crankcase chambers of the engine 12. This charge is then transferred to the combustion chambers and is fired by an ignition system including spark plugs 16 which are fired from the magneto generator 13 in a known manner.

The power head of the outboard motor 11 is completed by means of a protective cowling which is comprised of a lower tray portion 17 and a main cover portion 18 that is detachably affixed to the tray portion 17 in a suitable manner. In accordance with a feature of the invention, the tray portion 17 is formed from a rigid, highly heat conductive material such as aluminum or the like as is adapted to be affixed to the upper end of a drive shaft housing, shown partially in FIG. 1, in any well-known manner. The main cowling portion 18, on the other hand, may be formed from a molded fiberglass reinforced resin or the like, as is well known in this art.

In accordance with the invention, a rectifier, indicated generally by the reference 19, is provided with a flat lower surface 21 that is mounted on a flat upper surface of a boss or embossment 22 formed by the tray 17. Fasteners such as bolts or the like 23 serve to hold the rectifier 19 in good heat exchanging relationship with the boss 22 and tray 17. A conductor 24 conducts electricity from the alternator portion of the magneto generator 13 to the rectifier 19 for rectification and voltage regulation. The rectified and regulated direct current is supplied to the remotely positioned battery by means including a conductor 25.

Because of the fact that the rectifier 19 is mounted remotely from the engine 12, it will not be heated by the heat generated in the operation of the engine 12. Furthermore, the open positioning of the rectifier 19 within the interior of the protective cowling will permit it to be adequately cooled by air and by the heat transfer of the tray 17. In addition, water from the operation of the watercraft may further splash on the tray 17 to aid in its cooling. At the same time, however, the rectifier 19 is protected from this environment. Hence corrosion will not be a problem.

Figure 4:
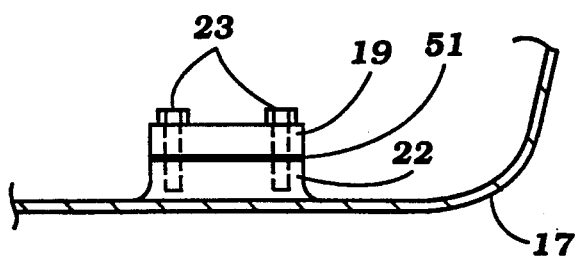
FIG. 4 is an enlarged side elevational view, in part similar to FIG. 3, showing another embodiment of the invention.

FIG. 4 shows another embodiment of the invention which is generally similar to the embodiment already described. In this embodiment, however, heat transfer is further promoted by interpositioning a heat transfer plate 51 between the rectifier 19 and the boss 22. The heat conductive plate 51 may be formed from a highly heat conductive material such as silicone, metal or the like so as to provide better terminal contact between the rectifier 19, boss 22 and tray 17 and higher heat conductivity.

It should be readily apparent the described embodiments are highly useful in maintaining good cooling for the rectifier without requiring cooling fins or the circulation of cooling water across the rectifier. Although two embodiments of the invention have been illustrated and described, various changes and modifications may be made without departing from the spirit and scope of the invention, as defined by the appended claims.

I claim:

1. An electrical system for an outboard motor comprising an outboard motor power head consisting of an internal combustion engine and a surrounding protective cowling comprised of a lower tray comprised of a highly heat conductive material having a boss extending upwardly from its lower surface and a main cowling portion detachably affixed to said tray, said lower tray being adapted to be affixed to the upper end of a drive shaft housing of the outboard motor, an alternator driven by said engine, an electrical circuit for receiving current from said alternator, including a component which becomes heated through its electrical operation the improvement comprising said component being mounted apart from the engine within the protective cowling affixed directly to said tray boss and a highly heat conductive material interposed between said component and said tray boss for improving the heat conduction from the component to the tray.

2. An electrical battery charging system for an outboard motor comprising an outboard motor power head consisting of an internal combustion engine and a surrounding protective cowling comprised of a lower tray comprised of a highly heat conductive material and a main cowling portion detachably affixed to said tray, said lower tray being adapted to be affixed to the upper end of a drive shaft housing of the outboard motor, an alternator driven by said engine, a rectifier for rectifying the current received from the alternator to provide a direct current voltage for charging an associated battery said rectifier being mounted apart from the engine within the protective cowling and affixed directly to said tray.

3. A battery charging system as set forth in claim 2 further including a highly heat conductive material interposed between the rectifier and the tray for improving the heat conduction from the rectifier to the tray.

* * * * *